United States Patent
Makino et al.

(10) Patent No.: US 9,729,026 B2
(45) Date of Patent: Aug. 8, 2017

(54) IN-WHEEL MOTOR AND IN-WHEEL MOTOR DRIVING DEVICE

(71) Applicant: NTN CORPORATION, Osaka (JP)

(72) Inventors: Yusuke Makino, Iwata (JP); Kenichi Suzuki, Iwata (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/132,848

(22) Filed: Apr. 19, 2016

(65) Prior Publication Data
US 2016/0233738 A1  Aug. 11, 2016

Related U.S. Application Data

(63) Continuation of application No. PCT/JP2014/077804, filed on Oct. 20, 2014.

(30) Foreign Application Priority Data

Oct. 29, 2013 (JP) ................... 2013-224312

(51) Int. Cl.
*H02K 7/14* (2006.01)
*H02K 1/28* (2006.01)
(Continued)

(52) U.S. Cl.
CPC ............ *H02K 7/14* (2013.01); *B60K 7/0007* (2013.01); *B60K 17/046* (2013.01); *H02K 1/27* (2013.01);
(Continued)

(58) Field of Classification Search
CPC  H02K 1/28; H02K 7/006; H02K 1/27; H02K 7/116; H02K 7/14; H02K 9/19;
(Continued)

(56) References Cited

U.S. PATENT DOCUMENTS 8,880,267 B2  11/2014  Ozaki
9,180,771 B2  11/2015  Yukishima et al.
(Continued)

FOREIGN PATENT DOCUMENTS

JP  2000-224813     8/2000
JP  2006094582 A  *  4/2006
(Continued)

OTHER PUBLICATIONS

International Search Report mailed Jan. 20, 2015, in corresponding International Application No. PCT/JP2014/077804.
International Preliminary Report on Patentability dated May 12, 2016 in corresponding International Patent Application No. PCT/JP2014/077804.
Extended and Supplementary Search Report dated Jun. 19, 2017 in corresponding European Patent Application No. 14 85 6837.

*Primary Examiner* — Naishadh Desai

(57) ABSTRACT

An electric motor which is an in-wheel motor includes a motor housing, a motor stator, a rotation shaft, a motor rotor, and a rotational sensor. The rotation shaft has: a shaft portion rotatably supported by a plurality of bearings; a flange portion spreading toward the outer diameter side from the outer circumference of the shaft portion; and a cylindrical portion extending from the outer diameter end of the flange portion in parallel with the shaft portion, and having an outer circumference to which the motor rotor is fitted. The axial position of the rotational sensor is between the plurality of bearings, and the rotational sensor is provided on the inner diameter side of the cylindrical portion of the rotation shaft.

6 Claims, 3 Drawing Sheets

(51) Int. Cl.
  *H02K 7/00*   (2006.01)
  *B60K 7/00*   (2006.01)
  *B60K 17/04*  (2006.01)
  *H02K 11/225* (2016.01)
  *H02K 1/27*   (2006.01)
  *H02K 7/116*  (2006.01)
  *H02K 9/19*   (2006.01)

(52) U.S. Cl.
  CPC ............ *H02K 1/28* (2013.01); *H02K 7/006* (2013.01); *H02K 7/116* (2013.01); *H02K 9/19* (2013.01); *H02K 11/225* (2016.01); *B60K 2007/0038* (2013.01); *B60K 2007/0092* (2013.01); *B60Y 2306/03* (2013.01); *Y02T 10/641* (2013.01)

(58) Field of Classification Search
  CPC ...... H02K 11/225; H02K 5/04; H02K 11/215; H02K 11/20; B60K 7/0007; B60K 17/046
  USPC ............................................ 310/68 B, 90, 91
  See application file for complete search history.

(56) References Cited

U.S. PATENT DOCUMENTS

| | | | | |
|---|---|---|---|---|
| 2004/0080223 | A1* | 4/2004 | Shimizu | B60K 7/0007 310/75 C |
| 2007/0063595 | A1* | 3/2007 | Habibi | H02K 1/2786 310/67 A |
| 2007/0241625 | A1* | 10/2007 | Terauchi | G01D 11/30 310/68 B |
| 2013/0292993 | A1 | 11/2013 | Yukishima et al. | |
| 2013/0325240 | A1 | 12/2013 | Ozaki | |

FOREIGN PATENT DOCUMENTS

| | | |
|---|---|---|
| JP | 2008-141908 | 6/2008 |
| JP | 2010-110110 | 5/2010 |
| JP | 2011-57011 | 3/2011 |
| JP | 2012-148725 | 8/2012 |
| JP | 2012-178903 | 9/2012 |

* cited by examiner

IN-WHEEL MOTOR AND IN-WHEEL MOTOR DRIVING DEVICE

CROSS REFERENCE TO THE RELATED APPLICATION

This application is a continuation application, under 35 U.S.C. §111(a), of international application No. PCT/JP2014/077804, filed Oct. 20, 2014, which is based on and claims Convention priority to Japanese patent application No. 2013-224312, filed Oct. 29, 2013, the entire disclosure of which is herein incorporated by reference as a part of this application.

BACKGROUND OF THE INVENTION

Field of the Invention

The present invention relates to an in-wheel motor used for a drive wheel of an electric vehicle, a hybrid electric vehicle, or the like, and to an in-wheel motor driving device having the in-wheel motor incorporated therein.

Description of Related Art

An in-wheel motor is provided together with a power transmission mechanism and the like in a limited space under a spring, or below a suspension device. Therefore, the axial dimension is desired to be as short as possible. An in-wheel motor is often combined with a reducer or reduction gear and the like, to be configured as an in-wheel motor driving device. In this case, the axial dimension is required to be further reduced.

As technical solution to reduce the axial dimension of an in-wheel motor driving device having the in-wheel motor and the reducer in combination, Patent Document 1 proposes the structure of an aluminum alloy housing in which housing portions of the reducer side and the in-wheel motor side are integrated and a wheel hub bearing is fixed to an outboard-side end surface member fitted to an outboard-side end face of the housing.

Patent Document 2 proposes a motor support structure for the hybrid electric vehicle or the like, in which a rotational sensor is provided on the outer diameter side in the radial direction of a rotor support bearing, thereby reducing the axial length of the entire motor.

RELATED DOCUMENT

Patent Document

[Patent Document 1] JP Laid-open Patent Publication No. 2012-148725
[Patent Document 2] JP Laid-open Patent Publication No. 2000-224813

Patent Document 1 describes reducing the axial dimension by improving the housing, but does not describe a rotational sensor. However, in an actual in-wheel motor, a rotational sensor for detecting rotation of a rotor is provided in a motor housing. For example, in an in-wheel motor made of an electric motor 1 shown in FIG. 3, a rotational sensor 30 is provided at the end portion opposite to the reducer 2 in a motor housing 8. The rotational sensor 30 hampers a reduction in the axial dimension. That is, the rotational sensor 30 is provided on the side opposite to the reducer in the axial direction of a motor rotor 10, and further, a bearing 11 for supporting a rotation shaft 6 of the electric motor 1 is provided on the side opposite to the reducer in the axial direction of the rotational sensor 30. Therefore, a radial-direction center portion 8A of the motor housing 8, in which at least the bearing 11 is provided, needs to be protruded outward in the axial direction.

In Patent Document 2, since the rotational sensor is provided on the outer diameter side in the radial direction of the rotor support bearing, the axial length can be reduced, but there is concern about an increase in the radial dimension. Since the in-wheel motor is provided at an inner diameter portion of a wheel, it is also necessary to avoid the increase in the radial dimension. In Patent Document 2, the sensor itself is enlarged, leading to high cost. Further, a gap against the sensor changes due to a moment load and vibration of the vehicle, and the like, and as a result, the detection accuracy becomes unstable. Therefore, the technique in Patent Document 2 is difficult to be applied to the in-wheel motor.

SUMMARY OF THE INVENTION

An object of the present invention is to provide an in-wheel motor and an in-wheel motor driving device which have a rotational sensor in a motor housing and which enable an axial dimension to be reduced without an increase in a radial dimension and with low cost.

Another object of the present invention is to provide an in-wheel motor and an in-wheel motor driving device having stable detection accuracy.

An in-wheel motor of the present invention includes: a motor housing; a motor stator fixed to the motor housing and including a core and a coil; a rotation shaft rotatably supported by the motor housing via a plurality of bearings; a motor rotor having a permanent magnet and attached to the rotation shaft so as to rotate in unison or together with the rotation shaft, the motor rotor being rotatable relative to the motor stator; and a rotational sensor configured to detect a rotation speed of the motor rotor. The rotation shaft has: a shaft portion rotatably supported by the plurality of bearings; a flange portion extending radially outwardly from an outer circumference of the shaft portion; and a cylindrical portion extending from an outer diameter end of the flange portion in parallel with the shaft portion. The motor rotor is fitted to the outer circumference of the cylindrical portion of the rotation shaft. An axial position of the rotational sensor is between the plurality of bearings, and the rotational sensor is provided on an inner diameter side of the cylindrical portion of the rotation shaft.

In this configuration, the rotational sensor is located on the inner diameter side of the cylindrical portion of the rotation shaft, whereby the rotational sensor and the bearing on the side where the rotational sensor is provided, of the plurality of bearings supporting the rotation shaft, can be located close to the center of the rotation shaft in the axial direction. As a result, the axial dimension of the in-wheel motor can be reduced. In addition, since the rotational sensor is located on the inner diameter side of the cylindrical portion of the rotation shaft, the rotational sensor can be downsized, leading to cost reduction. Further, since the rotational sensor is located between the plurality of bearings, the bearing and the rotational sensor do not overlap each other in the radial direction, and therefore the radial dimension of the in-wheel motor can be suppressed.

In addition, since the motor rotor is fitted to the outer circumference of the cylindrical portion of the rotation shaft, and the rotational sensor is located on the inner diameter side of the cylindrical portion of the rotation shaft, the rotational sensor is hidden by the cylindrical portion against the motor stator and the motor rotor. Therefore, influences of magnetic fields from the core of the motor stator and the magnet of the motor rotor can be reduced.

In the present invention, the rotational sensor may have a stator portion provided on the motor housing and a rotor portion provided on the rotation shaft; and the rotational sensor may be a winding-type sensor. In this configuration, since the rotor portion of the rotational sensor is provided on the rotation shaft supported by the plurality of bearings, vibration is suppressed in the rotor portion, and therefore the detection accuracy is stabilized. In addition, since the rotational sensor is a winding-type sensor, the rotational sensor is less likely to be influenced by noise, and can be used even under an adverse condition such as high humidity, low temperature, or vibration.

The stator portion and the rotor portion may be arranged side by side or in an overlapping manner in a radial direction of the rotation shaft. In this case, the length of the rotational sensor in the rotation shaft axial direction can be shortened, and the rotational sensor can be compactly provided in the motor housing. In the case where the stator portion and the rotor portion are provided as described above, since a comparatively large sensor providing space is formed between the shaft portion and the cylindrical portion of the rotation shaft, the rotational sensor can be provided in the sensor providing space.

For example, the rotational sensor may be a resolver. The resolver is less likely to be influenced by noise, and can be used even under an adverse condition such as high humidity, low temperature, or vibration. In addition, since the resolver has a high resolution, the resolver is suitable for an in-wheel motor of a vehicle.

An in-wheel motor driving device of the present invention includes: the in-wheel motor; a wheel bearing supporting the wheel; and a reducer configured to reduce a speed of rotation of the in-wheel motor and to transmit resultant rotation to the wheel bearing. By using the in-wheel motor having any of the above configurations of the present invention, the axial dimension of the in-wheel motor driving device can also be reduced without the increase in the radial dimension thereof and with low cost.

The in-wheel motor driving device including the in-wheel motor, the reducer, and the like may further include a lubricating oil supply mechanism configured to supply lubricating oil used both in lubrication for the reducer and in cooling of the in-wheel motor. Thus, a mechanism for lubrication and cooling is simplified.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1A:
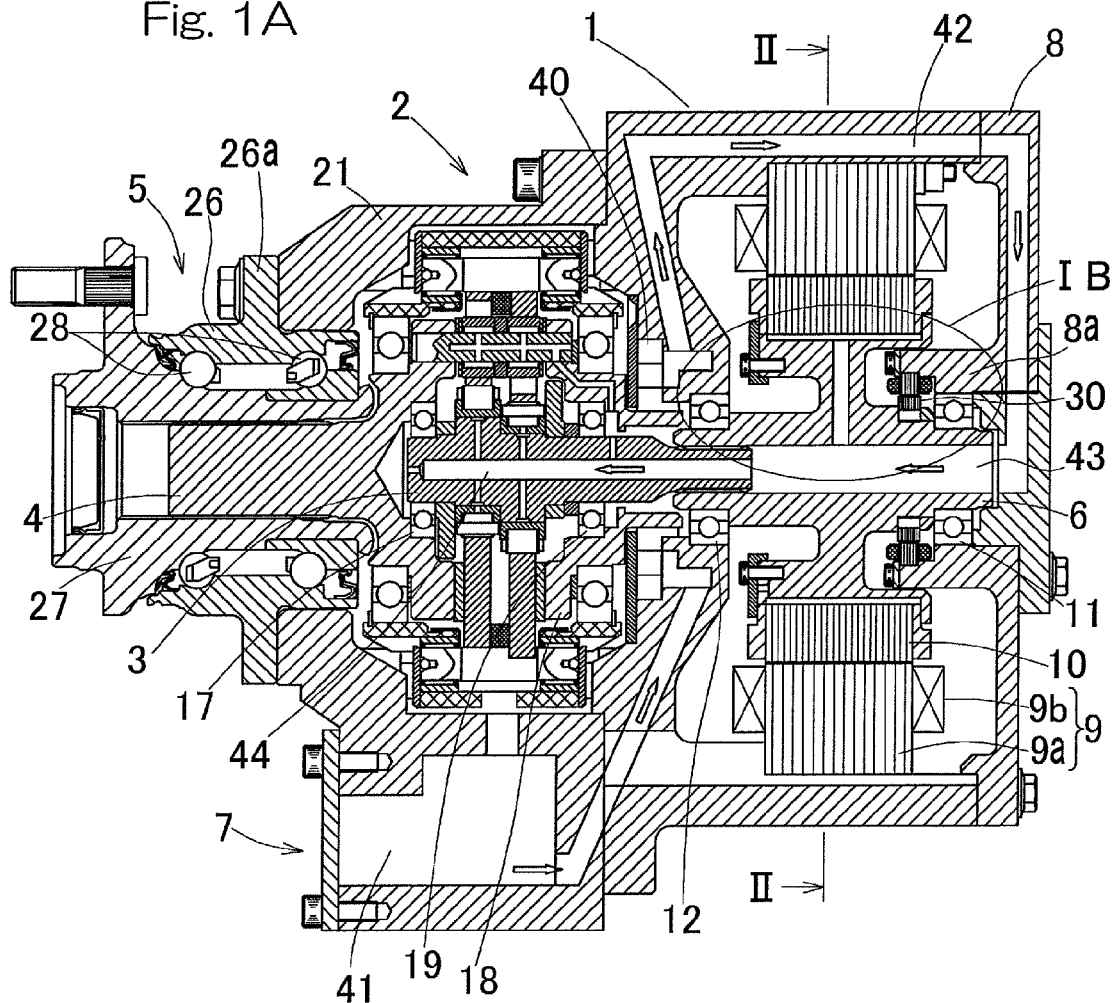
FIG. 1A is a sectional view of an in-wheel motor driving device having an in-wheel motor according to an embodiment of the present invention.
Figure 1B:
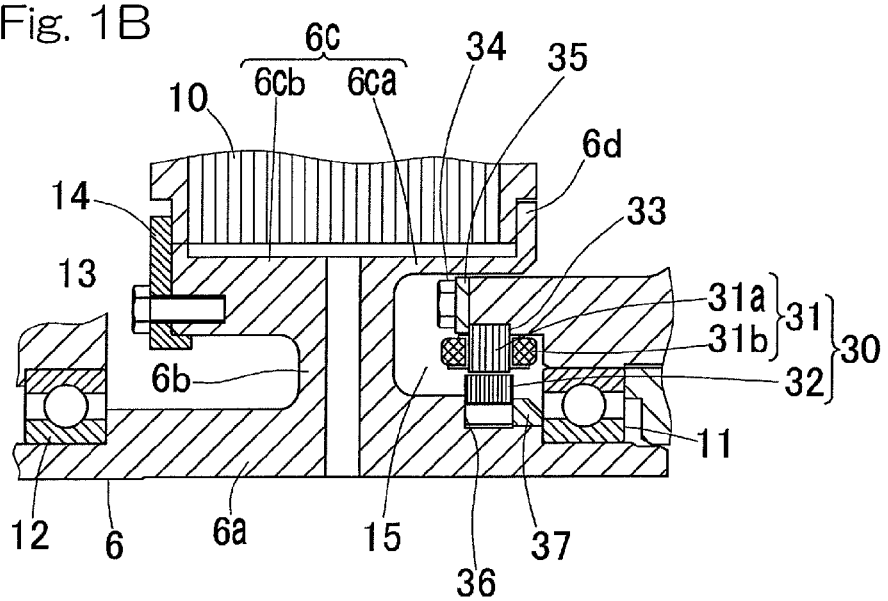
FIG. 1B is an enlarged view of part IB in FIG. 1A.

The embodiments of the present invention will be described with reference to the drawings. FIGS. 1A and 1B are sectional views of an in-wheel motor driving device having an in-wheel motor according to an embodiment of the present invention. The in-wheel motor driving device includes: an electric motor 1 which is an in-wheel motor for driving a wheel; a reducer or reduction gear 2 for reducing the speed of rotation of the electric motor 1; a wheel bearing 5 to be rotated by an output member 4 which is concentric with an input shaft 3 of the reducer 2; and a lubricating oil supply mechanism 7. The reducer 2 is interposed between the wheel bearing 5 and the electric motor 1, and a hub of the wheel which is a drive wheel supported by the wheel bearing 5 is coupled concentrically with a rotation shaft 6 of the electric motor 1.

Figure 2:
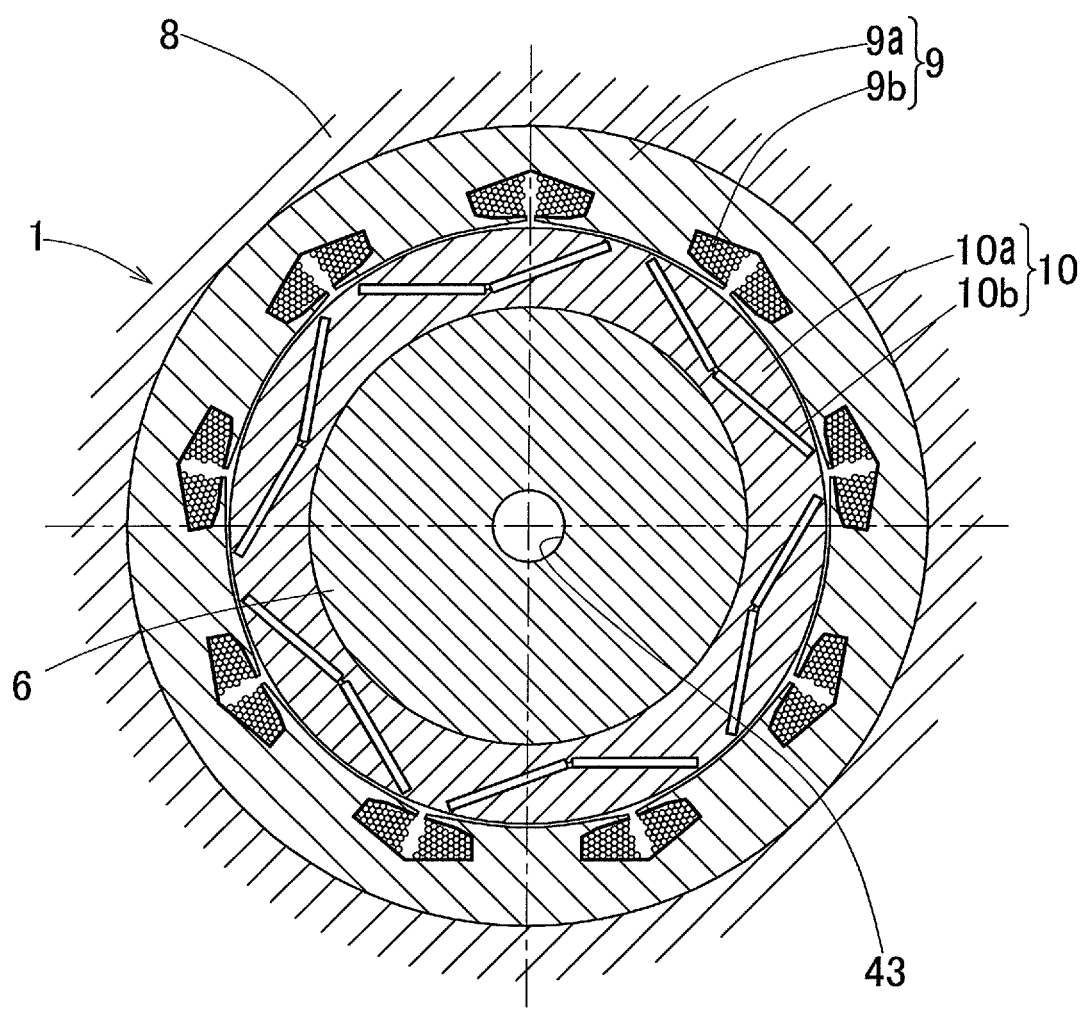
FIG. 2 is a partial sectional view along line II-II in FIG. 1A.
Figure 3:
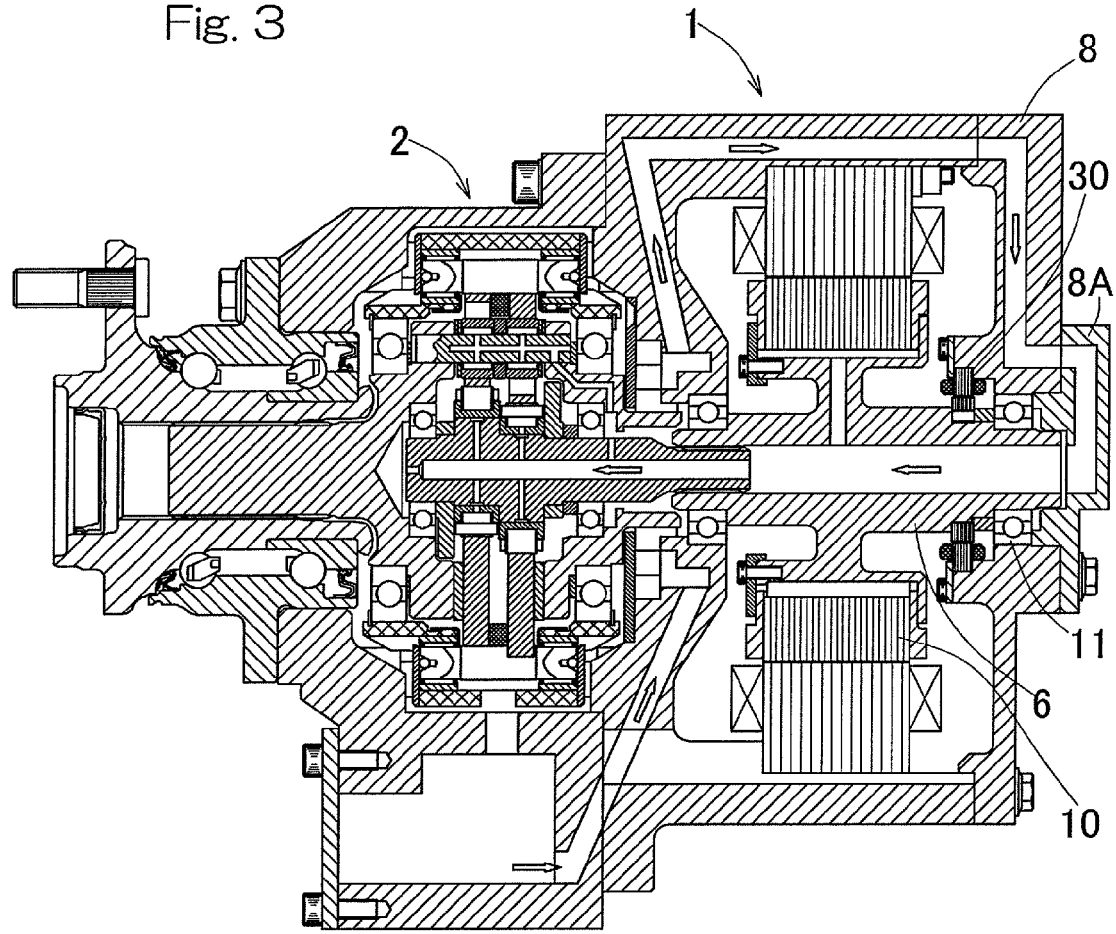
FIG. 3 is a sectional view of an in-wheel motor driving device having a conventional in-wheel motor.

The electric motor 1 includes a motor stator 9 and a motor rotor 10 which are housed in a motor housing 8. As shown in FIG. 2, the motor stator 9 has a stator core 9a and a coil 9b wound on the stator core 9a, and is fitted and fixed to an inner circumferential surface of the motor housing 8. The motor rotor 10 has a rotor core 10a and permanent magnets 10b incorporated in a V shape in the rotor core 10a. The motor rotor 10 is attached to the rotation shaft 6 and is rotatable relative to the motor stator 9. A radial gap is provided between the motor stator 9 and the motor rotor 10. That is, the electric motor 1 is an IPM motor (so-called interior permanent magnet synchronous motor) of a radial gap type.

In FIG. 1A, the motor housing 8 is provided with bearings 11 and 12 separated from each other in the axial direction. The rotation shaft 6 is rotatably supported by the bearings 11 and 12. The rotation shaft 6 is for transmitting a drive force of the electric motor 1 to the reducer 2.

As shown in FIG. 1B which is an enlarged view of a part IB in FIG. 1A, the rotation shaft 6 has: a shaft portion 6a rotatably supported by the plurality of bearings 11 and 12; a flange portion 6b extending radially outwardly or toward the outer diameter side, from the outer circumference of the shaft portion 6a in the vicinity of the center in the axial direction between the two bearings; and a cylindrical portion 6c extending from the outer diameter end of the flange portion 6b toward both sides in the axial direction in parallel with the shaft portion 6a.

The outer circumferential surface of the cylindrical portion 6c is a cylindrical surface having the same diameter across the entire region in the axial direction. The motor rotor 10 is fitted to this outer circumferential surface. In detail, the motor rotor 10 is fixed to the rotation shaft 6 by being sandwiched or held in the axial direction between a brim portion 6d formed at an end of the cylindrical portion 6c on the side (opposite reducer side) opposite to the reducer, and a rotor fixing member 14 attached by a bolt 13 on the reducer side end of the cylindrical portion 6c.

Of the cylindrical portion 6c, the radial thickness of an opposite reducer side portion 6ca with respect to the flange portion 6b is smaller than that of a reducer side portion 6cb, that is, the inner diameter of the opposite reducer side portion 6ca is greater. A space on the inner diameter side of the opposite reducer side portion 6ca, that is, a space between the shaft portion 6a and the opposite reducer side portion 6ca is utilized as a sensor providing space 15.

In the sensor providing space 15, a rotational sensor 30 for detecting the rotation speed of the motor rotor 10 is provided. The rotational sensor 30 is a winding-type sensor having: a stator portion 31 on the outer diameter side provided in a cylinder portion 8a of the motor housing 8; and a rotor portion 32 on the inner diameter side provided on the rotation shaft 6. Thus, the stator portion 31 and the rotor portion 32 are arranged side by side or in an overlapping manner in the radial direction of the rotation shaft 6. In the example in FIG. 1B, the rotational sensor 30 is a resolver, the stator portion 31 is composed of a core 31a and a coil 31b, and the rotor portion 32 is composed of an iron core or a coil. Instead of a resolver, the rotational sensor 30 may be formed by providing a magnetic encoder or a pulser ring to the rotor portion 32. Alternatively, the stator portion 31 may be a magnetic sensor composed of a semiconductor.

The cylinder portion 8a of the motor housing 8 protrudes from an opposite reducer side wall surface in the motor housing 8 toward the reducer side, and the end of the cylinder portion 8a reaches the sensor providing space 15. The stator portion 31 is fitted to the inner circumference of the end portion of the cylinder portion 8a. The stator portion 31 is fixed by being held in the axial direction between a step surface 33, of the cylinder portion 8a, which is stepped at the edge and is parallel with the radial direction, and a fixing member 35 fastened by a bolt 34 on an end surface of the cylinder portion 8a. The rotor portion 32 is fixed by being held in the axial direction between a step surface 36, of the shaft portion 6a, which is stepped at the edge and is parallel with the radial direction, and a nut 37 screwed to the outer circumference of the shaft portion 6a. The bearing 11 is provided between the cylinder portion 8a and the shaft portion 6a, at a position closer to the opposite reducer side than the position where the stator portion 31 and the rotor portion 32 are. Thus, the axial position of the rotational sensor 30 is between the bearings 11 and 12, and the rotational sensor 30 is located on the inner diameter side of the cylindrical portion 6c of the rotation shaft 6.

The reducer 2 in the example in FIG. 1A is a cycloidal reducer. The configuration of the cycloidal reducer is known, and the description thereof is omitted. The reducer 2 is not particularly limited to this cycloidal type, but various types of reducers other than the shown example may be used. The reducer 2 is located concentrically with the electric motor 1 and the wheel bearing 5.

One axial end of the input shaft 3 of the reducer 2 extends into the rotation shaft 6 and is spline-fitted to the rotation shaft 6. The input shaft 3 is supported by a bearing 17 provided on the output member 4 which is a member on the output side of the reducer 2, and a bearing 19 provided on a connection member 18 connected with the output member 4. Therefore, the input shaft 3 of the reducer 2 and the motor rotation shaft 6 are supported to be rotatable in unison by the bearings 11, 12, 17, and 19.

A suspension device (not shown in the drawings) of the vehicle is connected with a reducer housing 21 that houses the reducer 2. A vehicle body is mounted on the suspension device. The reducer housing 21 and the motor housing 8 are fixed to each other.

The wheel bearing 5 includes an outer member 26 having plural rows of raceway surfaces formed on the inner circumference thereof; an inner member 27 having raceway surfaces, opposed to the plural rows of raceway surfaces on the outer member 26 and formed on the outer circumference thereof; and plural rows of rolling elements 28 interposed between the raceway surfaces of the outer member 26 and the raceway surfaces of the inner member 27. The inner member 27 concurrently serves as a hub for mounting a drive wheel. The wheel bearing 5 is a double-row angular contact ball bearing. The rolling elements 28 are formed of balls, and retained by retainers for the respective rows. The outer member 26 serves as a stationary bearing ring, and has a flange 26a attached to the reducer housing 21. The inner member 27 is spline-fitted to the output member 4.

The lubricating oil supply mechanism 7 is a mechanism for supplying lubricating oil used both in lubrication for the reducer 2 and in cooling of the electric motor 1. The lubricating oil supply mechanism 7 sucks lubricating oil in a lubricating oil storage portion 41 in the reducer housing 21, by a pump 40, and circulates the lubricating oil via a lubricating oil flow path 42 formed in the motor housing 8 to a rotation shaft oil path 43 in the rotation shaft 6 and a reducer oil path 44 which is formed in the input shaft 3 and inside the reducer 2 in the vicinity thereof.

Operation and advantageous effects of the in-wheel motor will be described. According to the above configuration, the rotational sensor 30 is located on the inner diameter side of the cylindrical portion 6c of the rotation shaft 6, whereby the rotational sensor 30 and the bearing 11 on the side where the rotational sensor 30 is provided, of the plurality of bearings 11 and 12 supporting the rotation shaft 6, can be located close to the center in the axial direction. As a result, the axial dimension of the electric motor 1 which is the in-wheel motor can be reduced. In addition, since the rotational sensor 30 is located on the inner diameter side of the cylindrical portion 6c of the rotation shaft 6, the rotational sensor 30 can be downsized, thereby leading to cost reduction. Further, since the rotational sensor 30 is located between the plurality of bearings 11 and 12, the bearing 11 and the rotational sensor 30 do not overlap each other in the radial direction, and therefore the radial dimension of the electric motor 1 can be suppressed.

In addition, since the motor rotor 10 is fitted to the outer circumference of the cylindrical portion 6c of the rotation shaft 6, and the rotational sensor 30 is located on the inner diameter side of the cylindrical portion 6c of the rotation shaft 6, the rotational sensor 30 is hidden by the cylindrical portion 6c against the motor stator 9 and the motor rotor 10. Therefore, influences of magnetic fields from the core 9a of the motor stator 9 and the magnets 10b of the motor rotor 10 can be reduced.

In the present embodiment, the rotational sensor 30 includes the winding-type stator portion 31 provided on the motor housing 8, and the rotor portion 32 provided on the rotation shaft 6. In this configuration, since the rotor portion 32 of the rotational sensor 30 is provided on the shaft portion 6a of the rotation shaft 6 supported by the plurality of bearings 11 and 12, vibration is suppressed in the rotor portion 32, and therefore the detection accuracy is stabilized. In addition, since the rotational sensor 30 is a winding-type sensor, there is an advantage that the rotational sensor 30 is less likely to be influenced by noise, and can be used even under an adverse condition such as high humidity, low temperature, or vibration.

As in the present embodiment, in the case where the stator portion 31 and the rotor portion 32 are arranged side by side in the radial direction of the rotation shaft 6, the length of the rotational sensor 30 in the rotation shaft axial direction can be shortened, and the rotational sensor 30 can be compactly provided in the motor housing 8. In the case where the stator portion 31 and the rotor portion 32 are provided as described above, the diameter of the rotational sensor 30 increases, but as shown in the example in the drawing, the rotational sensor 30 can be provided in the comparatively large sensor providing space 25 formed between the shaft portion 6a and the cylindrical portion 6c of the rotation shaft 6.

In the present embodiment, a resolver is used as the rotational sensor 30. The resolver is less likely to be influenced by noise, and can be used even under an adverse condition such as high humidity, low temperature, or vibration. In addition, since the resolver has a high resolution, the resolver is suitable for an in-wheel motor of a vehicle.

By using the electric motor 1 of the above embodiment as an in-wheel motor, the axial dimension of the in-wheel motor driving device can also be reduced without the increase in the radial dimension thereof.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . electric motor (in-wheel motor)
2 . . . reducer
5 . . . wheel bearing
6 . . . rotation shaft
6a . . . shaft portion
6b . . . flange portion
6c . . . cylindrical portion
8 . . . motor housing
9 . . . motor stator
9a . . . core
9b . . . coil
10 . . . motor rotor
10b . . . permanent magnet
11, 12 . . . bearing
30 . . . rotational sensor
31 . . . stator portion
32 . . . rotor portion

What is claimed is:

1. An in-wheel motor comprising:
   a motor housing;
   a motor stator fixed to the motor housing and including a core and a coil;
   a rotation shaft rotatably supported by the motor housing via a plurality of bearings, the rotation shaft having; a shaft portion rotatably supported by the plurality of bearings, a flange portion extending radially outwardly from an outer circumference of the shaft portion, and a cylindrical portion extending from an outer diameter end of the flange portion in parallel with the shaft portion;
   a motor rotor having a permanent magnet and fitted to an outer circumference of the cylindrical portion of the rotation shaft so as to rotate together with the rotation shaft, the motor rotor being rotatable relative to the motor stator; and
   a rotational sensor configured to detect a rotation speed of the motor rotor, an axial position of the rotational sensor being between the plurality of bearings, the rotational sensor being provided in a sensor providing space between the shaft portion and an inner diameter side of the cylindrical portion of the rotation shaft, the inner diameter side facing to the shaft portion.

2. The in-wheel motor as claimed in claim 1, wherein the rotational sensor has a stator portion provided on the motor housing and a rotor portion provided on the rotation shaft; and
   the rotational sensor is a winding-type sensor.

3. The in-wheel motor as claimed in claim 2, wherein the stator portion and the rotor portion are arranged side by side in a radial direction of the rotation shaft.

4. The in-wheel motor as claimed in claim 1, wherein the rotational sensor is a resolver.

5. An in-wheel motor driving device comprising:
   the in-wheel motor claimed as in claim 1;
   a wheel bearing supporting the wheel; and
   a reducer configured to reduce a speed of rotation of the in-wheel motor and to transmit resultant rotation to the wheel bearing.

6. The in-wheel motor driving device as claimed in claim 5, further comprising:
   a lubricating oil supply mechanism configured to supply lubricating oil used both in lubrication for the reducer and in cooling of the in-wheel motor.

\* \* \* \* \*

UNITED STATES PATENT AND TRADEMARK OFFICE
CERTIFICATE OF CORRECTION

PATENT NO. : 9,729,026 B2
APPLICATION NO. : 15/132848
DATED : August 8, 2017
INVENTOR(S) : Yusuke Makino et al.

It is certified that error appears in the above-identified patent and that said Letters Patent is hereby corrected as shown below:

In the Claims

Column 8, Line 7:
In Claim 1, delete "having;" and insert -- having --, therefore.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*